United States Patent [19]
Najjar et al.

[11] Patent Number: 5,318,688
[45] Date of Patent: Jun. 7, 1994

[54] METHOD OF PREPARING A MEMBRANE

[75] Inventors: Mitri S. Najjar, Wappingers Falls, N.Y.; Carl A. Hultman, Waterford, Pa.

[73] Assignee: Texaco Inc., White Plains, N.Y.

[21] Appl. No.: 28,894

[22] Filed: Mar. 5, 1993

[51] Int. Cl.⁵ .......................... C25D 3/66; C25D 512; B01D 39/00; B32B 7/00
[52] U.S. Cl. .................................. 205/150; 205/170; 205/181; 205/184; 205/230; 210/500.25; 210/510.1; 210/496; 427/247; 427/404; 427/405
[58] Field of Search .................. 205/230, 231–233, 205/161, 150, 170, 181, 184; 427/243, 244, 247, 404, 405; 210/500.25, 510.1, 496; 204/64 R, 68–69

[56] References Cited

U.S. PATENT DOCUMENTS

| | | | |
|---|---|---|---|
| 2,873,233 | 2/1959 | Schnable | 205/230 X |
| 3,331,758 | 7/1967 | Levine | 205/161 X |
| 3,547,789 | 12/1970 | Andrews et al. | 205/230 |
| 3,615,862 | 10/1971 | Roth | 205/230 X |
| 3,887,396 | 6/1975 | Walsh et al. | 205/230 X |
| 4,274,926 | 6/1981 | Simon et al. | 205/230 |
| 4,364,803 | 12/1982 | Nidola et al. | 205/161 |
| 5,181,941 | 1/1993 | Najjar et al. | 205/231 X |

FOREIGN PATENT DOCUMENTS 0637455  12/1978  U.S.S.R. ............................. 205/230

Primary Examiner—Donald R. Valentine
Attorney, Agent, or Firm—George J. Darsa

[57] ABSTRACT

Gases such as hydrogen/hydrocarbon may be separated by a separating membrane of a Group VIII noble metal on a deposit of non-noble Group VIII metal which is supported on a porous silver or a porous carbon body.

11 Claims, No Drawings

METHOD OF PREPARING A MEMBRANE

RELATED APPLICATION

Application Ser. No. 07/726,434, filed Jul. 5, 1991 of Texaco Inc as assignee of Mitri S. Najjar, Tansukhlal G. Dorawala, and Uygur Kokturk, the text of which is incorporated herein by reference.

Application Ser. No. 07/807,489 filed Dec. 16, 1991 to Texaco Inc as assignee of Mitri S. Najjar and Carl Hultman, the text of which is incorporated herein by reference.

FIELD OF THE INVENTION

This invention relates to a method of preparing a novel membrane. More particularly it relates to method of preparing a membrane system which may be used to separate gases.

BACKGROUND OF THE INVENTION

As is well known to those skilled in the art, it may be desirable or necessary to separate various components from the streams which they are found in commercial operations. In the field of gas technology for example, it may be desirable to effect a separation between hydrogen and hydrocarbon gases in order to obtain one or the other, or both, in enriched or purified state. Prior art techniques to effect this separation include distillation—but distillation is characterized by high initial capital costs and substantial operating costs.

It is an object of this invention to provide a novel membrane system particularly characterized by its ability to separate gas streams into their components. Other objects will be apparent to those skilled in the art from the following.

STATEMENT OF THE INVENTION

In accordance with certain of its aspects, this invention is directed to a method of preparing a membrane suitable for use in separating a mixture of more permeable gas and less permeable gas which comprises depositing iron, cobalt, or nickel as non-noble Group VIII coating onto the surface of a porous silver or porous graphite body thereby forming a porous silver or porous graphite body bearing iron, cobalt, or nickel as a non-noble Group VIII coating;

depositing on said porous silver or porous graphite body bearing iron, cobalt, or nickel as a non-noble Group VIII coating, a layer of Group VIII noble metal on top of said non-noble Group VIII coating from a bath containing (i) a halide of an alkali metal or alkaline earth metal, (ii) a source of fluoride ions, and (iii) a source of Group VIII noble metal thereby forming a porous silver or porous graphite body bearing iron, cobalt, or nickel as a non-noble Group VIII coating and on top thereof a layer of Group VIII noble metal; and recovering said porous silver or porous graphite body bearing iron, cobalt, or nickel as a non-noble Group VIII coating and on top thereof a layer of Group VIII noble metal.

In accordance with certain of its other aspects, this invention is directed to a method of preparing a membrane suitable for use in separating a mixture of more permeable gas and less permeable gas which comprises maintaining, in a bath container, at 450° C.-1300° C. a molten salt bath containing (i) a halide of an alkali metal or of an alkaline earth metal, (ii) a source of fluoride ions, and (iii) a source of Group VIII noble metal;

maintaining, in said molten salt bath, as cathode, (i) a porous silver cathode or (ii) a porous carbon cathode bearing thereon a deposit of non-noble Group VIII metal;

maintaining, in said molten salt bath, an anode;

passing a direct current through said cathode, said bath, and said anode thereby depositing on said cathode a thin, dense membrane layer of Group VIII noble metal; and recovering said cathode bearing a thin, dense membrane layer of Group VIII noble metal.

DESCRIPTION OF THE INVENTION

In accordance with one aspect of the practice of this invention, the membrane of this invention may be formed on a porous silver or porous carbon (e.g. graphite) body or support. The configuration or shape of the porous carbon body will depend on the form of the structure in which the membrane assembly is to be used. Although it is possible to utilize a porous carbon body in the form of a flat sheet, it is found to be more desirable to utilize a tubular configuration. The inside diameter of the tubular body may typically be 3-50 mm, say 7 mm. The outside diameter is typically 5-52 mm, say 9 mm. It is found to be convenient to utilize porous tubular silver or graphite members having a length of 25 cm-200 cm, say 150 cm. The porosity of the porous carbon tubular bodies may be 30-70%, say 50%. Comparable porosities may be available for silver tubular bodies.

Illustrative of the preferred commercially available tubular carbon bodies may be the a porous graphite tube having an outside diameter of 9 mm, an inside diameter of 7 mm, and a length of 150 cm.

In practice of the process of this invention there is first formed thereon (preferably on the inside of the tubular surface of the porous support) a deposit of a non-noble Group VIII metal such as iron, cobalt, or more preferably nickel on which will later be deposited a layer of Group VIII noble metal which serves as the separating layer. Although it may be possible to form the deposit by a variety of techniques such as cladding, immersion plating, etc, it is preferred to employ electrodeposition from an aqueous bath or a molten salt bath. This, in one embodiment, may be carried out by use of an aqueous bath of a bath-soluble salt (e.g. a halide of iron, cobalt, or nickel). Typically there may be used a Watts bath containing 240-340, say 330 g/l $NiSO_4 \cdot 7H_2O$, 30-60, say 45 g/l $NiCl_2 \cdot 6H_2O$, and 30-40, say 38 g/l $H_3BO_3$ at pH 1.5-4.5 and temperature of 45° C.-65° C. Bath additives such as dispersants, surfactants, brighteners etc may be present.

Direct current is passed through the porous graphite body as cathode, the bath, and an anode (typically an insoluble anode of e.g. carbon) at cathode current density of 2.5-10, say 5 amperes per square decimeter (asd) to form on the cathode a thin electrodeposit of non-noble Group VIII metal preferably nickel.

In accordance with another aspect of the practice of this invention, the membrane may be formed on a porous silver body or support. Typically the silver support may be a tube of the same dimensions as those noted for the carbon body supra. Illustrative of the preferred commercially available porous silver bodies may be a silver tube having an outside diameter of 9 mm, an inside diameter of 7 mm, and a length of 150 cm.

It is also possible to form a deposit of non-noble Group VIII metal on the porous carbon or porous silver cathode by electrodeposition from a molten salt bath.

In accordance with one preferred aspect of this invention, preparation of the membrane system of this invention may be effected by electrodeposition from a molten salt bath of a Group VIII noble metal onto the porous silver or porous carbon body support bearing thereon a deposit of non-noble Group VIII metal. The bath may be formed (preferably in a graphite container) of a salt having a melting point of 450° C.–1300° C. (but not higher than the melting point of the metals present including the Group VIII noble metal or alloy thereof to be deposited). The preferred components of the bath include salts of alkali metals. Clearly the salts employed will be stable at the temperatures of operation.

Alkali metals which may be employed as their salts may include sodium, potassium, rubidium, cesium, or lithium. These metals may be employed as the halide e.g. fluoride, chloride, bromide, or iodide. It is preferred to utilize alkali metals as their fluorides; and the preferred alkali metal halide may be lithium fluoride or sodium fluoride. It is more preferred to employ a mixture of halides typified by the eutectic composition of 61 mole % lithium fluoride and 39 mole % sodium fluoride. This eutectic has a melting point of 649° C. at atmospheric pressure.

Alternatively the molten salt bath may contain an alkaline earth metal halide. The alkaline earth metals which may be employed as their salts may include calcium, barium, strontium, or magnesium. The preferred component is calcium fluoride. It may be possible to employ alkaline earth halides as mixtures thereof or with the alkali metal halides.

Preferably the mixture of salts will be such that the melting point of the mixture is within the preferred operating range of 500° C.–1300° C., say 600° C.–800° C., preferably 649° C. Illustrative mixtures which may be employed may include the following:

TABLE

| | Components | Mole % | Mixture Melting Point °C. |
|---|---|---|---|
| A | LiF | 61 | 649 |
| | NaF | 39 | |
| B | LiF | 52 | 510 |
| | KF | 48 | |
| C | CaCl$_2$ | 60 | 597 |
| | BaCl$_2$ | 40 | |
| D | KF | 80 | 780 |
| | CaF$_2$ | 20 | |
| E | LiF | 50 | 621 |
| | BaF$_2$ | 35 | |
| | NaF | 15 | |

The bath typically also contains at least one salt of the noble Group VIII metal typified by the following:

TABLE

| |
|---|
| PtF$_2$ |
| PtF$_4$ |
| PtCl$_2$ |
| PtCl$_3$ |
| PdCl$_2$ |

If it be desired to deposit an alloy, the bath may contain bath-soluble salts of other metals typified by Cr, Cu, Ni, Rh, etc—in addition to Pd or Pt. An alloy of Pd-Pt may be deposited.

It is a feature of the process of this invention that the Group VIII noble metal be preferably deposited (on the support bearing the non-noble metal) in the presence of an ion containing fluoride. Typically this ion may be $F^{31}$, $F_2^=$, $SiF_6^=$, $HF_2^-$, $C_2H_3FO_2^-$, $PO_3F^=$, $PF_6^-$, $SO_3F^-$, etc, preferably $F^{31}$. These ions will be derived from the bath-soluble salts typified by salts of alkali metals or alkaline earth metals. When the bath is formed of molten salts containing a fluoride ion, it may not be necessary to add additional fluorine ions—as in the case of the preferred LiF/NaF eutectic. When the bath is formed of non-fluoride-containing components (such as the eutectic of CaCl$_2$/BaCl$_2$) it is preferred to add fluorine ions typically as sodium fluoride or more preferably potassium fluoride.

In practice of the process of the invention, a direct current of electricity is passed through the cathode, the bath, and the anode. Typically the potential across the bath may be 0.1–2.0 volts, preferably 0.2–1.0 volts, say 0.1 volts. The cathode current density may be 0.1–4.0, preferably 0.2–1.0, say 0.3 amperes per square decimeter (asd). Electrodeposition for 0.05–120 minutes, typically 10–30 minutes may yield an electrodeposit of Group VIII noble metal, preferably palladium, which has a thickness of 0.05–200 microns, preferably 0.2–50 microns, say 15 microns.

Preferably electrodeposition is carried out in a container of graphite, nickel, Monel metal, or iron.

In the preferred embodiment of this invention, electrodeposition is carried out in the presence of an inert gas typified by nitrogen or the inert gases of Group O of the Periodic Table. It is preferred to use argon.

Preferably the argon is admitted by bubbling beneath the surface of the molten salt bath. In the preferred embodiment, the argon is admitted beneath the surface of the bath through a nickel conduit.

It is also found that the cathode should preferably be immersed within the molten salt bath for 10–30 minutes, say 10 minutes prior to the start of electrodeposition. It appears that this step may drive occluded gases from the cathode and permit attainment of a more satisfactory electrodeposit.

Although it may be possible to electrodeposit the thin, dense layer of Group VIII noble metal, preferably palladium or platinum on the outside of the preferred tubular graphite cathode bearing the non-noble Group VIII metal, it is preferred to electrodeposit the thin dense layer onto the inside surface of the carbon or graphite, bearing the layer of non-noble Group VIII metal. This may be carried out using a bath containing a Group VIII noble metal composition, or more preferably a wire anode of Group VIII metal within the tubular cathode—as this will minimize problems arising from inadequate throwing power of the bath which might be observed if the anode were located outside the tubular cathode. In the case of a flat cathode, as in the case of the tubular cathode, it may be possible to effect electrodeposition on both sides of the cathode—but this is not necessary when the system is to be used as a separation membrane.

The electrodeposited layer, after removal from the bath and cooling to ambient temperature of 20° C.–80° C., say 40° C. is preferably washed with water to dissolve therefrom any salts carried over from the bath.

It is a feature of the process of this invention that the thin deposit of Group VIII noble metal, preferably of platinum or palladium (or alloy thereof), is dense and non-porous.

Typically the plated tubular product may be a tube of a porous graphite body of 5–25 mm, say 9 mm outside diameter, 3–20, say 7 mm inside diameter and, 25–200 cm, say 150 cm in length bearing on the inside surface a thin layer of nickel on top of which is a 0.05–10 micron, say 0.2 micron thin, dense platinum or palladium layer having a thickness of 0.2–50 microns, say 15 microns.

It will be found that the deposited metal diffuses into the porous substrate to form an alloy or solid solution therewith; and it becomes an integral part thereof rather than being only mechanically attached to the surface as may be the case with many electrodeposits. Observation reveals a sub-surface layer, of e.g. carbon-metal or silver-metal, on which may be found a layer of metal.

It is also a feature of the process of this invention that there may be further electrodeposited on top of the thin dense membrane layer of the Group VIII noble metal, preferably platinum or palladium, a layer of an alloy of platinum or palladium. The alloy may be an alloy of e.g. palladium and a metal of Group I B (e.g. Cu, Ag, Au), II B (Zn or Cd preferably), IVA, (Sn preferably), VI B (Cr, Mo, W), or VIII (Fe, Co, Ni, Ru, Rh, Os, Ir, or Pt).

Illustrative of such alloys of palladium may be those containing the following metals in the indicated percentages: 2–50 w % Cr, 30–45 w % Cu, 3–15 w % Ni, 5–20 w % Rh, 5–15 w % Ru, 4–30 w % Pt, 2–65 w % Ag, 1–20 w % Sn etc. These alloys may be deposited onto the first deposit from a bath at conditions similar to those employed in the first electrodeposition operation.

In accordance with certain of its aspects, this invention is directed to a method of separating hydrogen from a charge gaseous mixture containing hydrogen and a gaseous hydrocarbon which comprises passing a charge gaseous mixture containing hydrogen and a gaseous hydrocarbon into contact with a thin, dense separating layer of a Group VIII noble metal bonded to a deposit of non-noble Group VII metal on the outer surface of a porous support of (i) porous silver or (ii) porous carbon.

maintaining a pressure drop across said thin dense separating layer of a Group VIII noble metal bonded to a deposit of non-noble Group VIII metal on the outer surface of a porous support of (i) porous silver or (ii) porous carbon. thereby forming a retentate containing a decreased content of hydrogen and a permeate containing an increased content of hydrogen;

recovering said retentate containing a decreased content of hydrogen from the high pressure side of said thin dense separating layer of Group VIII noble metal bonded to a deposit of non-noble Group VIII metal on the outer surface of a porous support of (i) porous silver of (ii) porous carbon; and recovering said permeate containing an increased content of hydrogen from the low pressure side of said thin dense separating layer of Group VIII noble metal bonded to a deposit of non-noble Group VIII metal on the outer surface of a porous support of (i) porous silver of (ii) porous carbon.

In practice of the process of this invention, the charge stream may be a gaseous mixture containing hydrogen and a gaseous hydrocarbon. Typically the hydrocarbon may be a $C_1$–$C_4$ hydrocarbon—methane, ethane, n-propane, n-butane, or iso-butane. Commonly the charge may contain 20–80, say 78 v % hydrogen and 20–80 say 22 v % hydrocarbon. Typical charge mixtures may be as follows:

TABLE

| Component | V % Broad | V % Typical |
| --- | --- | --- |
| Hydrogen | 20–80 | 78 |
| Methane | 5–20 | 10 |
| Ethane | 4–15 | 7 |
| Propane | 1–5 | 2 |
| Butane | 1–5 | 2 |
| i-butane | 0–4 | 1 |

Other hydrocarbons may also be present—typified by olefins, aromatics, naphthenes, etc.

The charge gas may be a stream from a dehydrogenation (or a hydrogenation) unit wherein it is desired to recover products or to shift the equilibrium during dehydrogenation or hydrogenation.

The charge stream typically at 200°–600° C., say 447° C. and 200–1500 psi, say 1000 psig is passed into contact with the thin, dense separating membrane layer of Group VIII noble metal which preferably has been deposited on the inside of a porous tubular conduit of porous carbon bearing the layer of non-noble Group VIII metal. Preferably the charge passes through the conduit at a flow rate of between 300–900 $cm^3$/min per square cm of surface, say 550 $cm^3$/min per square cm of surface.

As the charge passes through the tubular conduit, a portion of the charge diffuses through the wall of the conduit. The permeate is found to contain an increased content of hydrogen—and the retentate contains a decreased content of hydrogen. Typically it may be possible to treat a charge containing 20–90 v %, say 78 v % hydrogen (plus hydrocarbon) and to attain a permeate containing 90–100 v %, say 99.9 v % hydrogen. The retentate within the tubular member may typically contain 20–30v %, say 25 v % hydrogen.

In practice of the invention, a plurality of tubes may be preferably formed in a heat-exchanger-like structure, and the charge is admitted to and passes e.g. through the tube side from which the retentate is also withdrawn. The hydrogen-enriched permeate is withdrawn through the shell side. It will be apparent to those skilled in the art that greater degrees of concentration (e.g. purity of hydrogen) may be attained by passing the permeate through additional stages.

DESCRIPTION OF SPECIFIC EMBODIMENTS

Practice of the process of this invention will be apparent to those skilled in the art from the following wherein as elsewhere in this specification, all parts are parts by weight unless otherwise stated.

EXAMPLE I

In this Example which represents the best mode presently known of preparing the separating membrane, the cathode to be employed is a graphite tubular carbon body of outside diameter of 9 mm; inside diameter of 7 mm; and length of 150 cm.

There is first electrodeposited on the inside of the graphite tube a layer of nickel by immersion in an aqueous bath containing 45 g/l of nickel chloride $NiCl_2 \cdot 6H_2O$, 330 g/l of nickel sulfate $NiSO_4 \cdot 7H_2O$, and 38 g/l of boric acid $H_3BO_3$. Using an inert carbon anode within the tube, electrodeposition occurs at 50° C. using a cathode current density of 5 asd. The graphite tubular body is recovered bearing a coating of nickel on the inside thereof.

There is prepared, in a nickel container, a bath containing:

| Component | w % |
|---|---|
| lithium fluoride | 61 |
| sodium fluoride | 39 |

The mixture of lithium fluoride and sodium fluoride is the eutectic mixture melting at about 649° C.

The so-formed graphite tube bearing the nickel layer is then immersed in the eutectic bath which is heated to 820°±20° C. The cathode is mounted on a cathode holder of graphite so that in operation, the entire cathode is submerged within the bath. The cathode is allowed to remain in the molten bath for 15 minutes prior to electroplating. A palladium anode wire is mounted within the tubular cathode; and voltage of 440±40 millivolts is applied between the cathode and the anode, at a cathode current density of 0.1 amps per square decimeter. During electrodeposition, argon is bubbled into the bath through a carbon conduit.

There is deposited on the inside of the tubular graphite cathode, on top of the nickel deposit, a thin, dense layer of palladium, of thickness of 15 microns.

EXAMPLE II

In this Example which represents the best mode presently known of separating hydrogen by practice of the process of this invention, the charge is:

TABLE

| Component | Vol % |
|---|---|
| Hydrogen | 78 |
| Methane | 22 |

This charge at 447° C. and 1000 psig is admitted to the tube side of a heat-exchanger-like structure containing 19 tubes each prepared in accordance with Example I. The total membrane area is 0.11 m².

After steady state is reached, it is found that the permeate is substantially pure hydrogen and the retentate contains a decreased content of hydrogen.

EXAMPLES III-VI

Results comparable to those of Example I may be attained if the metal layer deposited on the non-noble metal layer, is an alloy as follows:

| Example | Metal Layer |
|---|---|
| III | Pd—Pt |
| IV | Pd—Cr |
| V | Pd—Cu |

Although this invention has been illustrated by reference to specific embodiments, it will be apparent to those skilled in the art that various changes and modifications may be made which clearly fall within the scope of the invention.

What is claimed is:

1. The method of preparing a membrane, suitable for use in separating a mixture of more permeable and less permeable gas, which comprises
    depositing iron, cobalt, or nickel as a non-noble Group VIII coating onto the surface of a porous silver or porous graphite body thereby forming a porous silver or porous graphite body bearing iron, cobalt, or nickel as a non-noble Group VIII coating;
    depositing on said porous silver or porous graphite body bearing iron, cobalt, or nickel as a non-noble Group VIII coating, a layer of Group VIII noble metal, on top of said non-noble Group VIII coating, from a molten salt bath containing (i) a halide of an alkali metal or an alkaline earth metal, (ii) a source of fluoride ions, and (iii) a source of Group VIII noble metal thereby forming a membrane comprising a porous silver or porous graphite body bearing iron, cobalt, or nickel as a non-noble Group VIII coating and, on top thereof, a layer of Group VIII noble metal; and
    recovering said membrane comprising said porous silver or porous graphite body bearing iron, cobalt, or nickel as a non-noble Group VIII coating and, on top thereof, a layer of Group VIII noble metal.

2. The method of preparing a membrane suitable for use in separating a mixture of a more permeable gas and a less permeable gas which comprises
    maintaining, in a bath container, at 500° C.–300° C. a molten salt bath containing (i) a halide of an alkali metal or of an alkaline earth metal, (ii) a source of fluoride ions, and (iii) a source of Group VIII noble metal;
    maintaining, in said molten salt bath, as cathode, (i) a porous silver cathode or (ii) a porous carbon cathode bearing thereon a deposit of non-noble Group VIII metal;
    maintaining, in said molten salt bath an anode;
    passing a direct current through said cathode, said bath, and said anode thereby depositing on said cathode a thin, dense membrane layer of Group VIII noble metal; and
    recovering said cathode bearing a thin, dense membrane layer of Group VIII noble metal.

3. The method of preparing a membrane suitable for use in separating a mixture of a more permeable gas and a less permeable gas as claimed in claim 2 wherein said molten salt bath contains a fluoride of an alkali metal.

4. The method of preparing a membrane suitable for use in separating a mixture of a more permeable gas and a less permeable gas as claimed in claim 2 wherein said source of fluoride ions in said molten salt bath is a simple or a complex fluoride of an alkali metal.

5. The method of preparing a membrane suitable for use in separating a mixture of a more permeable gas and a less permeable gas as claimed in claim 2 wherein said source of fluoride ions in said molten sat bath is a fluoride.

6. The method of preparing a membrane suitable for use in separating a mixture of a more permeable gas and a less permeable gas as claimed in claim 2 wherein said molten salt bath contains (i) lithium fluoride and (ii) sodium fluoride or potassium fluoride.

7. The method of preparing a membrane suitable for use in separating a mixture of a more permeable gas and a less permeable gas as claimed in claim 2 wherein said molten salt bath contains the eutectic of lithium fluoride and sodium fluoride.

8. The method of preparing a membrane suitable for use in separating a mixture of a more permeable gas and a less permeable gas as claimed in claim 2 wherein said Group VIII noble metal is palladium.

9. The method of preparing a membrane suitable for use in separating a mixture of a more permeable gas and a less permeable gas as claimed in claim 2 wherein said molten bath contains a bath-soluble halide of platinum or palladium as a source of Group VIII noble metal.

10. The method of preparing a membrane suitable for use in separating a mixture of a more permeable gas and a less permeable gas as claimed in claim 2 wherein said cathode is a porous carbon cathode bearing thereon on electrodeposit of non-noble Group VIII metal.

11. The method of preparing a membrane suitable for use in separating a mixture of hydrogen and a gaseous hydrocarbon which comprises maintaining, in a bath container, at temperature at least as high as eutectic temperature, a molten salt bath containing a eutectic mixture of lithium fluoride and sodium fluoride;

maintaining in said bath a source of palladium;

maintaining in said bath a porous carbon cathode bearing thereon a deposit of nickel;

maintaining in said bath an anode;

passing a direct current through said cathode, said bath, and said anode thereby depositing on said cathode a thin dense membrane layer of palladium thereby forming a membrane comprising said cathode bearing a thin dense membrane layer of palladium; and recovering said membrane comprising said cathode bearing a thin dense membrane layer of palladium.

* * * * *